UNITED STATES PATENT OFFICE.

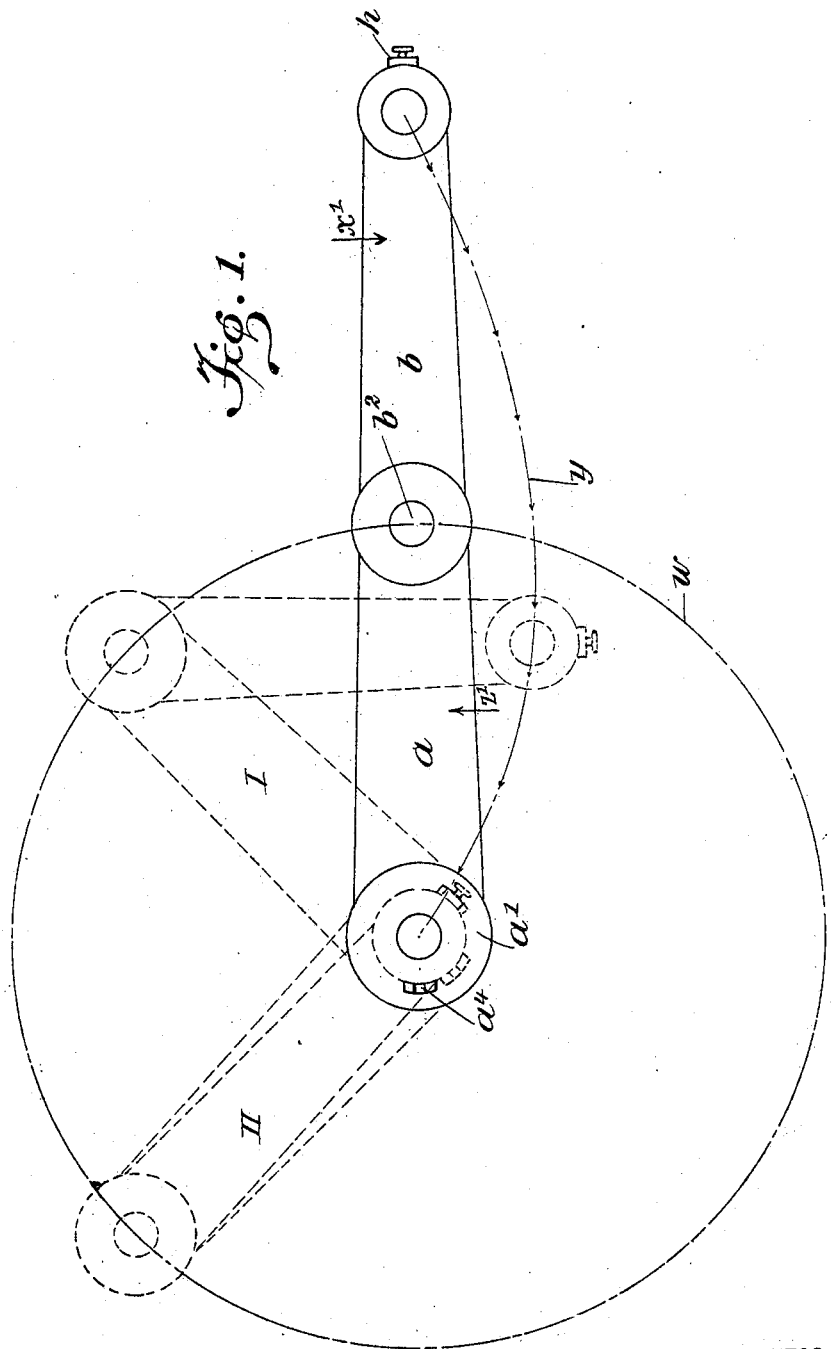

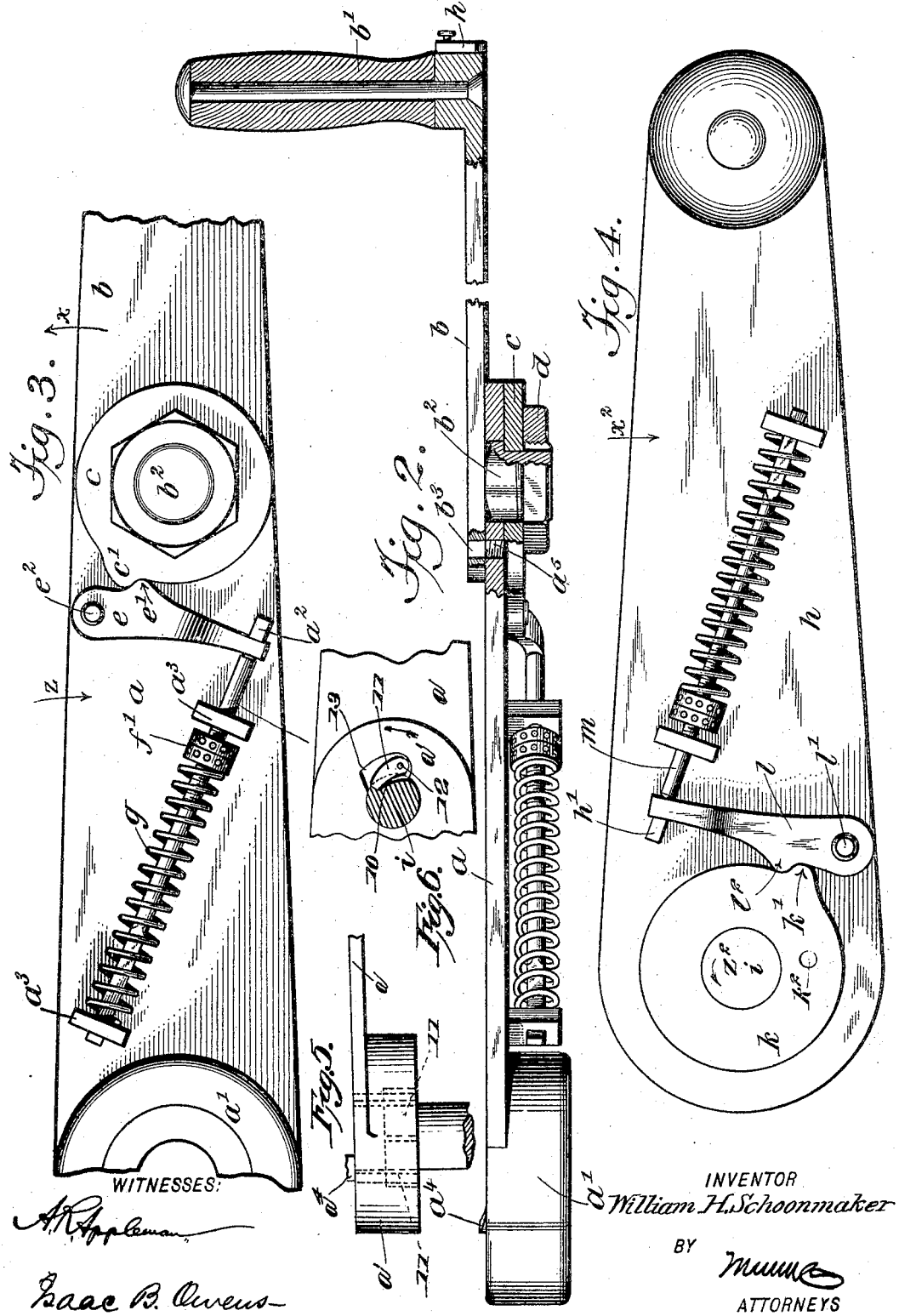

WILLIAM H. SCHOONMAKER, OF MONTCLAIR, NEW JERSEY.

STARTING-CRANK FOR EXPLOSIVE-ENGINES.

No. 798,366.   Specification of Letters Patent.   Patented Aug. 29, 1905.

Application filed August 6, 1903. Serial No. 168,501.

*To all whom it may concern:*

Be it known that I, WILLIAM H. SCHOONMAKER, a citizen of the United States, and a resident of Montclair, in the county of Essex and State of New Jersey, have invented a new and Improved Starting-Crank for Explosive-Engines, of which the following is a full, clear, and exact description.

This invention relates to a crank adapted especially for use in connection with internal-combustion engines in manually starting or "turning over" the same.

Heretofore a common disadvantage and danger has existed in the backward turns of the engines, due to premature explosions during the starting operation, thus causing the crank or starting device to be violently torn from the hands of the operator and frequently injuring him. My invention overcomes this disadvantage by providing a crank which as the engine "kicks back" automatically releases its connection with the engine, so that the engine-shaft may perform one or more revolutions without carrying the crank with it. This end I attain by certain novel mechanism, which will be hereinafter fully set forth.

This specification is a specific description of two forms of my invention, while the claims are definitions of the actual scope thereof.

Reference is to be had to the accompanying drawings, forming a part of this specification, in which similar characters of reference indicate corresponding parts in all the figures.

Figure 1 is a diagrammatic view illustrating the action of a form of the invention designed especially for larger engines—say, for example, for engines of ten horse-power or more. Fig. 2 is a side elevation of the crank illustrated in Fig. 1, with parts shown in section in Fig. 2. Fig. 3 is a fragmentary front view of the crank, and Fig. 4 is a front view of a simplified form of the invention designed especially for smaller engines. Figs. 5 and 6 are detail views, on a somewhat-reduced scale, representing the manner in which the starting-crank is applied to or mounted upon the engine-shaft.

Referring particularly to Figs. 2 and 3, the crank is formed in two sections $a$ and $b$, the section $a$ being the inner section and having a hub $a'$ adapted to be fastened to the engine-shaft in the usual manner—*i. e.*, by a clutch which allows the shaft to turn ahead without moving the arm, but which fixes the arm to the shaft upon backward movement of the shaft—and the outer section $b$ having the crank-handle $b'$, adapted to slide therein in the usual or any desired manner. Said sections $a$ and $b$ are pivotally connected by a stud $b^2$, which is fastened to the section $b$ and projects loosely through the section $a$. The stud $b^2$ has a disk $c$ fastened thereon, and $d$ indicates a nut or its equivalent secured to the end of the stud $b^2$. This arrangement allows the section $b$ of the crank to turn freely on the section $a$, carrying with it the disk $c$. Said disk $c$ is provided with a peripheral projection or cam $c'$, coacting with a corresponding projection $e'$ on an arm $e$, which is pivoted by a pin $e^2$ on the section $a$ of the crank. The free end of the arm $e$ is engaged with a stop $a^2$ on the crank-section $a$ and is held yieldingly in this position by a rod $f$, which is guided longitudinally by two lugs $a^3$ on the crank-section $a$ and pressed toward the arm $e$ by means of an expansive spring $g$, which encircles the rod and bears between the inner lug $a^3$ and two pin or spanner nuts $f'$ on the rod $f$ adjacent to the outer lug $a^3$. The end of the rod $f$ passing through the inner lug $a^3$ is square to prevent its turning while adjusting spring $g$ by the pin-nuts $f'$. $h$ indicates a spring-catch mounted on the outer end of the crank-section $b$, and $a^4$ indicates two lugs which are formed on the hub $a'$ of the crank in position to be engaged by the catch $h$.

Referring to Fig. 3, the arrow $x$ may be taken to indicate the direction in which the manual force is applied to the outer crank-section $b$ to start the engine. This will tend to turn the stud $b^2$ and disk $c$ in the same direction, and consequently the projection $c'$ of the disk $c$ will engage the projection $e'$ of the arm $e$, and a crank-like joint will be effected between the two crank-sections, causing them to move as a single rigid structure, the strength of the spring $g$ being sufficient to resist the tendency of the projection $c'$ to pass the projection $e'$. Should the engine explode prematurely and the shaft begin a backward movement, carrying with it the crank-section $a$ in the direction of the arrow $z$ in Fig. 3, the arm $e$, with its projection $e'$, will, it may be seen, be moved away from the stud of the cam $c'$ of the disk $c$, and a relative movement between the sections $a$ and $b$ of the crank will begin. This movement is illustrated in Fig. 1. In this view the arrow $x'$ corresponds to the arrow $x$ in Fig. 3, and the arrow $z'$ corresponds to the arrow $z$ in said figure. When the crank-shaft begins its backward movement, carrying the crank-section $a$ in the direction of the arrow $z'$, the crank-section $b$ swings around the stud or setter $b^2$, its free end following approximately the broken line $y$ in Fig. 1, and the crank-sections $a$ and $b$ successively assuming the positions indicated by the Roman numerals I and II until finally the free end of the section $b$, carrying the handle $b'$, swings into axial coincidence with the engine-shaft, whereupon the catch $h$, Fig. 2, will engage with the keeper-lugs $a^4$ and the handle $b'$ of the crank will have no movement other than a rotary movement, and if the handle be arranged to turn on the crank-section $b$ even this rotary movement of the handle $b'$ may be avoided. The two sections $a$ and $b$ of the crank in the doubled-up position (indicated by the Roman numeral II) will then be swung around, as indicated by the circle $w$ in Fig. 1, until the backward movement is arrested, and then the crank may be again straightened out to its operative position and the starting operation again begun.

It will be seen from the full and dotted lines in Fig. 1 that the keeper-lugs $a^4$ are so arranged on the hub of the crank-section $a$ that when the crank-sections are doubled up, as indicated by Roman numeral II in Fig. 1, the catch $h$ will engage automatically with the keeper-lugs, and thus fasten the parts $a$ and $b$ temporarily against independent movement, causing them to swing around with the crank-shaft as though they were a single arm attached to the shaft. If any of the parts of the apparatus should become inoperative, the sections $a$ and $b$ of the crank may be connected rigidly to form them into an ordinary crank-arm by inserting a pin or screw in the registering-orifices $a^5$ and $b^3$. This pin is not shown, but in practice may be carried with the tools and used as may be necessary.

The simplified form of the invention illustrated in Fig. 4 may be used on smaller engines where the "back kick" results in but a single or less than a single backward revolution of the shaft. In this view the single rigid crank $h$ is mounted loose on the engine-shaft $i$, and a disk $k$ is fastened to said shaft by the clutch usually applied to the starting-crank— i. e., a clutch which allows the engine-shaft to turn ahead without swinging the arm, but which fastens the arm and shaft together as the shaft is turned backward. This disk has a projection or cam $k'$ similar to the projection of cam $c'$ in Fig. 3. An arm $l$, similar to the arm $e$, is pivoted on a pin $l'$, carried by the crank $h$, and said arm $l'$ is provided with a projection $l^2$ similar to the projection $e'$ and coacting with the cam $k'$, as shown. The arm $l$ bears against a stud $h'$, fastened to the crank $h$, and is held yieldingly in this position by means of the rod $m$ with a spring and other parts similar to the rod $f$, above described. It will be observed that with this construction when the crank $h$ is turned in the direction of the arrow $x^2$ to start the engine the parts $l^2$ and $k'$ engage and the crank $h$ is fixed to the shaft $i$. Should, however, the engine begin a backward movement and the shaft turn in the direction of the arrow $z^2$ in Fig. 4, the cam or projection $k'$ and the disk $k$ will turn with the shaft, so that the cam $k'$ rides along the projection $l^2$ of the arm $l$, and the arm $l$ will be released from the engine-shaft for one revolution, so that no danger can result to the operator from the back kick of the engine. $k^2$ indicates an orifice similar to the orifice $b^3$, in which a key or screw may be inserted to rigidly connect the parts $k$ and $h$.

Various changes in the form, proportions, and minor details of my invention may be resorted to at will without departing from the spirit and scope thereof. I consider myself entitled to all such variations as may lie within the scope of my claims.

If desired, the crank may be provided with a suitable case to cover the parts of the invention, and with the construction shown in Figs. 1 and 3 the case may be applied simply to the crank-section $a$, while in the construction shown in Fig. 4 this case may cover that side of the crank $h$ on which the operating parts are arranged. This case is not illustrated in the drawings.

By referring to Figs. 5 and 6 it will be seen that the starting-crank is applied to the engine-shaft $i$ by forming the latter with one or more grooves 10, in which is received the operative end of one or more pawls 11, which are pivoted at 12 in recesses 13 therefor in the hub $a'$ of the section $a$ of the starting-crank. On manipulating the starting-crank to start the engine-shaft the end walls of the grooves 10 will be engaged by the operative ends of said pawls, and it will be understood that the motion of the engine-shaft will then continue to take place without interference therewith by the pawls.

Having thus described my invention, I claim as new and desire to secure by Letters Patent—

1. A starting-crank for engines, comprising a member adapted for mounting upon the engine-shaft, another member pivoted thereto, and devices engaging each other for effecting rigid relationship between the members, on turning the last-named member to start the engine, said devices adapted to move apart on reversal of the engine, to cause a relative movement of the members to each other.

2. A starting-crank for engines, comprising a member adapted for mounting upon the engine-shaft, another member pivoted thereto, devices engaging each other for effecting rigid relationship between the members, on turning the last-named member to start the engine, said devices adapted to move apart on reversal of the engine, to cause a relative movement of the members to each other, and means for automatically locking said members together when carried substantially parallel to each other.

3. A starting device for engines, comprising an inner crank-section, an outer crank-section pivoted thereto, a handle attached to the outer crank-section, and means for releasably holding the outer crank-section in extended position.

4. A starting-crank for engines, comprising an inner crank-section, an outer crank-section pivoted thereto, a handle attached to the outer crank-section, said crank-sections being of approximately equal lengths, and means for releasably holding the crank-sections in extended position, or in position in which one section lies alongside of the other section.

5. A starting-crank for engines, comprising an inner section, an outer section pivoted to the inner section, a projection carried by the pivot of the sections, and a spring-pressed arm carried by one of the sections and engaging the projection of the pivot.

6. A starting-crank for engines, comprising an inner section, an outer section pivoted to the inner section by a stud carried by the outer section, said stud supporting a projection, and a spring-pressed arm carried by the inner section of the crank and engaging the projection of the stud.

7. A starting-crank for engines, comprising an inner section, an outer section pivoted to the inner section by a stud carried by the outer section, a disk on the stud and provided with a projection, and a spring-pressed arm carried by the inner section of the crank and engaging the projection of the disk.

8. A starting-crank for engines, consisting of an inner section, an outer section, pivoted to the inner section by a stud carried by the outer section, a disk on the stud and provided with a projection, a pivoted arm on the inner section and provided with a projection engaging the projection of the stud, a stop for said arm, and a sliding and spring-pressed rod engaging the said arm.

In testimony whereof I have signed my name to this specification in the presence of two subscribing witnesses.

WILLIAM H. SCHOONMAKER.

Witnesses:
 Isaac B. Owens,
 Jno. M. Ritter.